United States Patent
Oka

(10) Patent No.: US 9,470,155 B2
(45) Date of Patent: Oct. 18, 2016

(54) PREIGNITION RESTRAINING DEVICE

(71) Applicant: DENSO CORPORATION, Kariya, Aichi-pref. (JP)

(72) Inventor: Kuniaki Oka, Obu (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/735,616

(22) Filed: Jun. 10, 2015

(65) Prior Publication Data

US 2015/0361914 A1    Dec. 17, 2015

(30) Foreign Application Priority Data

Jun. 13, 2014 (JP) .................................. 2014-122330

(51) Int. Cl.
| | |
|---|---|
| *F02D 35/02* | (2006.01) |
| *F02D 13/02* | (2006.01) |
| *F02D 23/02* | (2006.01) |
| *F01L 1/34* | (2006.01) |
| *F01L 13/00* | (2006.01) |
| *F02D 41/00* | (2006.01) |

(52) U.S. Cl.
CPC ....... *F02D 13/0223* (2013.01); *F02D 13/0242* (2013.01); *F02D 23/02* (2013.01); *F02D 35/027* (2013.01); *F02D 41/0002* (2013.01); *F01L 1/34* (2013.01); *F01L 2013/11* (2013.01); *F02D 13/0219* (2013.01); *F02D 13/0238* (2013.01); *F02D 13/0249* (2013.01); *F02D 2041/001* (2013.01); *F02D 2041/0092* (2013.01); *Y02T 10/18* (2013.01); *Y02T 10/42* (2013.01)

(58) Field of Classification Search
CPC ... F01L 1/34; F01L 2013/11; F02D 13/0219; F02D 13/0238; F02D 13/0249; F02D 35/027; F02D 2041/0092
USPC ....................................................... 123/90.15
See application file for complete search history.

(56) References Cited

U.S. PATENT DOCUMENTS

2012/0089315 A1* 4/2012 Makino ............... F02D 13/0238
701/102
2015/0204249 A1* 7/2015 Glugla .................. F02B 37/168
123/90.15

FOREIGN PATENT DOCUMENTS

JP    2013-221413    10/2013

* cited by examiner

*Primary Examiner* — Jorge Leon, Jr.
(74) *Attorney, Agent, or Firm* — Nixon & Vanderhye P.C.

(57) ABSTRACT

An ECU has an output-value obtaining portion, a preignition estimating portion and a valve-opening-time controller. The output-value obtaining portion obtains the output value of the knock sensor, which corresponds to an intensity of an engine knocking. A preignition estimating portion estimates that a preignition will be generated in an internal combustion engine, when the obtained output value is greater than or equal to the specified threshold. When the preignition estimating portion estimates that a preignition will be generated, the exhaust-valve timing control mechanism advances the opening time of the exhaust valve to suppress the preignition.

8 Claims, 8 Drawing Sheets

PREIGNITION RESTRAINING DEVICE

CROSS-REFERENCE TO RELATED APPLICATION

This application is based on Japanese Patent Application No. 2014-122330 filed on Jun. 13, 2014, the disclosure of which is incorporated herein by reference.

TECHNICAL FIELD

The present disclosure relates to a preignition restraining device which suppresses a preignition of an internal combustion engine.

BACKGROUND

As an abnormal combustion in a cylinder of an internal combustion engine, a preignition is well known. The preignition is a phenomenon in which air-fuel mixture in a cylinder is self-ignited earlier than a proper ignition timing. In a case where a portion close to an ignition plug is a heat source, the preignition is continuously generated. In a case where suspended matters such as oil droplets and carbon deposits are the heat source, the preignition is suddenly generated.

JP-2013-221413A (DE-102013205795A1) shows an abnormal-combustion detecting device which is provided with a preignition detecting portion which determines whether a preignition is generated, and a preignition identification portion which determines whether the preignition is suddenly generated due to the suspended matters in a cylinder. Moreover, when a sudden preignition is detected, the abnormal-combustion detecting device executes a fuel-quantity-increase control in which a fuel injection quantity is increased, so that the generation of the preignition is restrained.

In the above abnormal-combustion detecting device, after the preignition is actually generated, the fuel-quantity-increase control is executed for suppressing the successive preignitions. Therefore, it is impossible to prevent the generation of the preignition, beforehand. Moreover, the fuel-quantity-increase control causes an increase in fuel consumption.

SUMMARY

It is an object of the present disclosure to provide a preignition restraining device which can improve a possibility of preventing a generation of preignition and suppress the generation of preignition without increasing a fuel consumption.

According to a research of the present inventor, when a large knocking is generated, carbon deposits separate and fall from an inner wall of a cylinder, which causes a preignition due to suspended matters in a cylinder. In a case of an engine having a supercharger, the preignition is effectively suppressed by adjusting an opening time of an exhaust valve. Moreover, in a case of a natural intake engine, the preignition is effectively suppressed by adjusting a closing time of an intake valve.

The present disclosure can be applied to an engine having a supercharger and a natural intake engine.

According to one aspect of the present disclosure, a preignition restraining device is applied to an engine having a supercharger, which is provided with a valve-opening-time control mechanism and a knocking detecting device. The valve-opening-time control mechanism controls a valve opening time of at least exhaust valve. The knocking detecting device detects an intensity of the engine knocking. The preignition restraining device is provided with an output-value obtaining portion, a preignition estimating portion and a valve-opening-time controller.

An output-value obtaining portion obtains the output value of the knock detecting device, which corresponds to an intensity of an engine knocking. The preignition estimating portion estimates that a preignition will be generated in an internal combustion engine, when the obtained output value is greater than or equal to a specified threshold. When the preignition estimating portion estimates that a preignition is generated, the valve-opening-time controller advances the opening time of an exhaust valve to suppress the preignition.

According to another aspect of the present disclosure, a preignition restraining device is applied to a natural intake engine, which is provided with a valve-closing-time control mechanism and a knocking detecting device. The valve-closing-time control mechanism controls a valve closing time of at least intake valve. The knocking detecting device detects an intensity of the engine knocking. The preignition restraining device is provided with an output-value obtaining portion, a preignition estimating portion and a valve-closing-time controller.

When the preignition estimating portion estimates that a preignition is generated, the valve-closing-time controller retards the closing time of an intake valve to suppress the preignition.

According to the above configuration, it can be estimated that a preignition will be generated due to suspended matters in a cylinder, beforehand. Therefore, a suppressing control can be executed before the preignition is generated, so that the preignition can be avoided beforehand.

Moreover, in the suppressing control, a valve opening-and-closing time of an exhaust valve or an intake valve is adjusted, so that the preignition can be suppressed without a fuel consumption increase.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
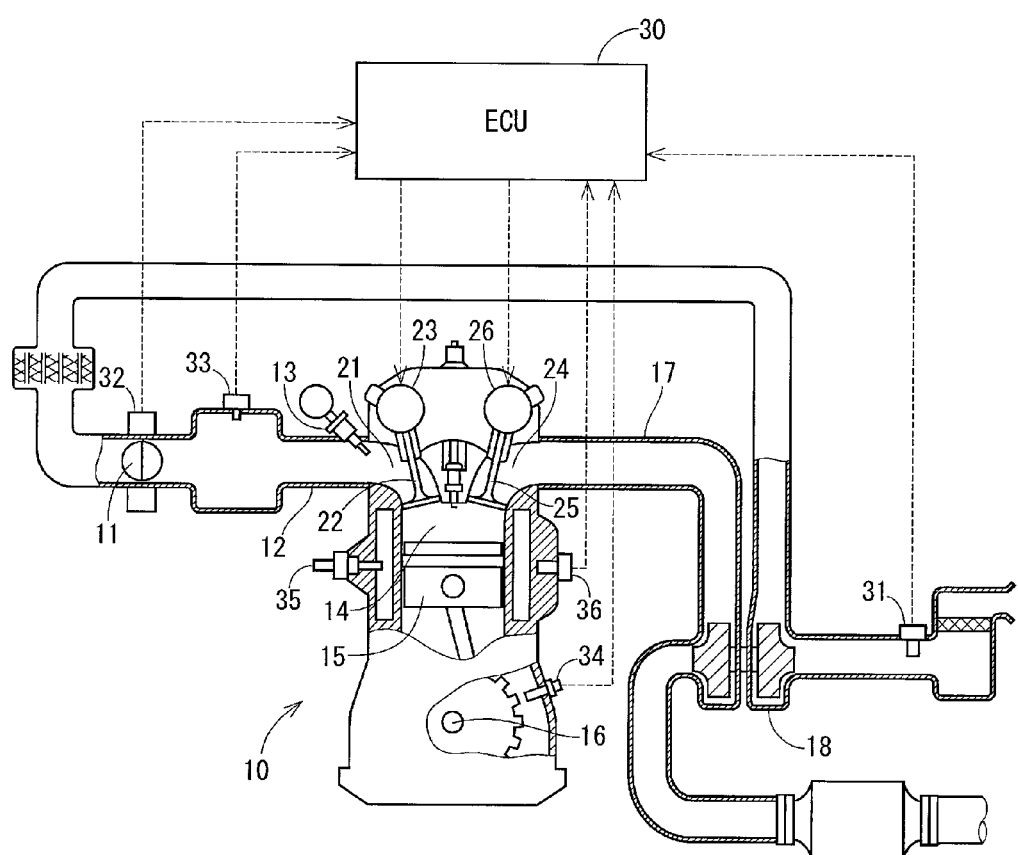
FIG. 1 is a chart showing an engine control system according to a first embodiment.

Multiple embodiments of the present invention will be described with reference to accompanying drawings. In each embodiment, the substantially same parts and the components as each embodiment are indicated with the same reference numeral and the same description will not be reiterated.

<First Embodiment>

An electronic control unit as a preignition restraining device is applied to an engine shown in FIG. 1.

[Configuration of Engine 10]

A configuration of an engine 10 will be explained with reference to FIGS. 1 to 4. As shown in FIG. 1, the engine 10 has a combustion chamber 14 into which a fresh air and a fuel are introduced. The fresh air is supplied from an intake manifold 12 through a throttle valve 11. A fuel injector 13 injects the fuel into the in the combustion chamber 14. The air-fuel mixture in the combustion chamber 14 is combusted to reciprocate a piston 15. The reciprocating motion of the piston 15 is changed into a rotary motion of the crankshaft 16. Combustion gas is emitted into atmosphere through an exhaust manifold 17. In present embodiment, the engine 10 is provided with a supercharger 18.

An intake valve 22 is provided to an intake port 21 of the combustion chamber 14. The intake valve 22 is driven by an intake camshaft (not shown). When the intake valve 22 opens the intake port 21, the fresh air is introduced into the combustion chamber 14. An intake-valve timing control mechanism 23 adjusts a valve timing of the intake valve 22. In present embodiment, the intake-valve timing control mechanism 23 is electrically driven by a motor according to a command signal transmitted from an electronic control unit (ECU) 30.

An exhaust valve 25 is provided to an exhaust port 24 of the combustion chamber 14. The exhaust valve 25 is driven by an exhaust camshaft (not shown). When the exhaust valve 25 opens the exhaust port 24, the combustion gas is exhausted. An exhaust-valve timing control mechanism 26 adjusts a valve timing of the exhaust valve 25. In present embodiment, the exhaust-valve timing control mechanism 26 is electrically driven by a motor according to a command signal transmitted from the ECU 30.

The ECU 30 has a microcomputer which includes a CPU, a ROM, RAM, an input/output part and the like. Specifically, the ECU 30 is electrically connected to an airflow meter 31, a throttle sensor 32, an intake pressure sensor 33, a crank angle sensor 34, a water temperature sensor 35, and a knock sensor 36. Based on the outputs of the above sensors, the ECU 30 controls a throttle valve 11, the fuel injector 13, the intake-valve timing control mechanism 23, the exhaust-valve timing control mechanism 26 and the like.

The knock sensor 36 is a vibration sensor which detects intensity of vibration of the engine 10. The intensity of the vibration of the engine 10 has a correlation with a knocking of the engine 10. That is, the output of the knock sensor 36 represents an intensity of the knocking of the engine 10.

The valve timing control of the intake valve 22 and the exhaust valve 25 will be explained hereinafter. At a time of starting the engine 10, the valve timing of the intake valve 22 and the exhaust valve 25 is set up as shown in FIG. 2.

Figure 3:
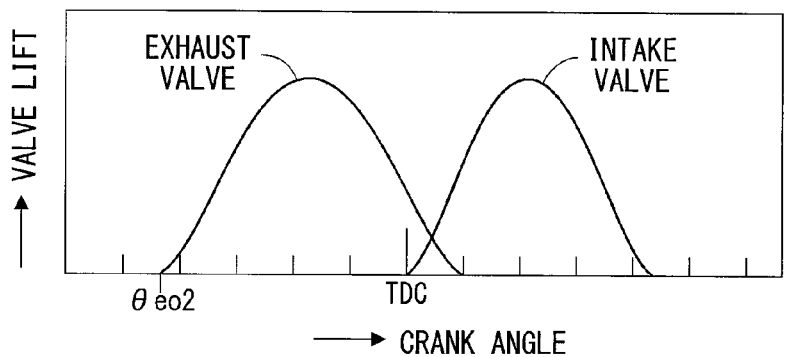
FIG. 3 is a chart showing a relationship between a crank angle and a valve lift amount of an exhaust valve and an intake valve at a time of improving an engine torque.

In a case that the engine 10 is provided with the supercharger 18, when an increase in torque is needed, the valve timing of the exhaust valve 25 is retarded as shown in FIG. 3. At this time, the valve timing of the intake valve 22 is the same as that at the time of starting the engine 10. Alternatively, the valve timing of the intake valve 22 is retarded according to the valve timing of the exhaust valve 25. FIG. 3 shows a case where the valve timing of the intake valve 22 is the same as that at the time of starting the engine 10.

Figure 4:
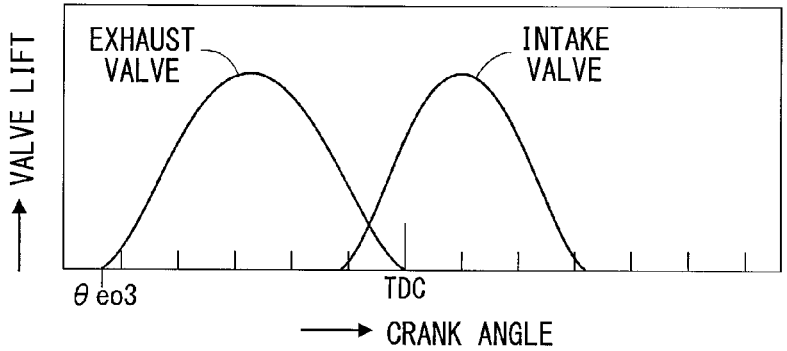
FIG. 4 is a chart showing a relationship between a crank angle and a valve lift amount of an exhaust valve and an intake valve at a time of improving a fuel economy.

Meanwhile, when it is necessary to improve a fuel economy, the valve timing of the intake valve 22 is advanced as shown in FIG. 4. At this time, the valve timing of the exhaust valve 22 is the same as that at the time of starting the engine 10. Alternatively, the valve timing of the exhaust valve 25 is advanced according to the valve timing of the intake valve 22. FIG. 4 shows a case where the valve timing of the exhaust valve 25 is advanced.

Figure 2:
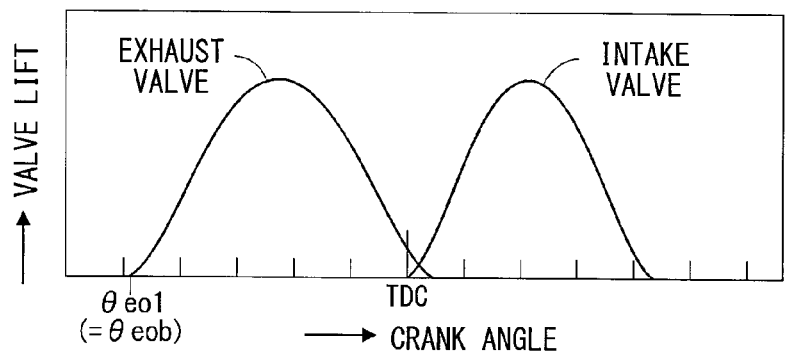
FIG. 2 is a chart showing a relationship between a crank angle and a valve lift amount of an exhaust valve and an intake valve at a time when an engine is started.

The exhaust-valve timing control mechanism 26 adjusts the valve timing of the exhaust valve 25 so that an opening time of the exhaust valve 25 can be changed between θeo1 and θeo3, as shown in FIG. 2 to FIG. 4.

The valve timing control of the intake valve 22 and the exhaust valve 25 for starting the engine 10, improving the torque, or improving the fuel economy will be referred to as "normal valve timing control", hereinafter.

[Configuration of ECU 30]

Figure 5:
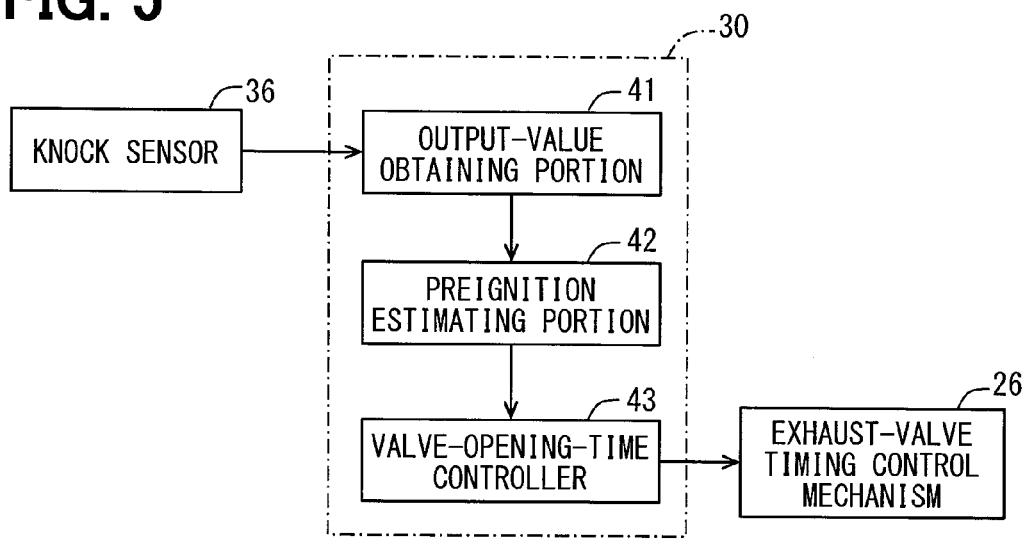
FIG. 5 is a block chart showing an electronic control unit according to the first embodiment.

Referring to FIGS. 2 to 7, a configuration of the ECU 30 will be explained. As shown in FIG. 5, the ECU 30 has functions for estimating whether a preignition will be generated due to suspended matters in the cylinder and for suppressing the preignition. Specifically, the ECU 30 has an output-value obtaining portion 41, a preignition estimating portion 42 and a valve-opening-time controller 43. The output-value obtaining portion 41 obtains the output value of the knock sensor 36, which corresponds to an intensity of an engine knocking.

The preignition estimating portion 42 estimates that a preignition will be generated in the engine 10, when a peak value of the output value of the knock sensor 36 is greater than or equal to a specified threshold. This estimation is based on the research of the present inventor. That is, when a large knocking is generated, carbon deposits separate and fall from an inner wall of a cylinder, which causes a preignition due to suspended matters in a cylinder. When a relatively large knocking is generated and the output value of the knock sensor 36 exceeds the threshold, it is estimated that carbon deposits separate and fall from an inner wall of a cylinder, which causes a preignition due to suspended matters in a cylinder.

Figure 6:
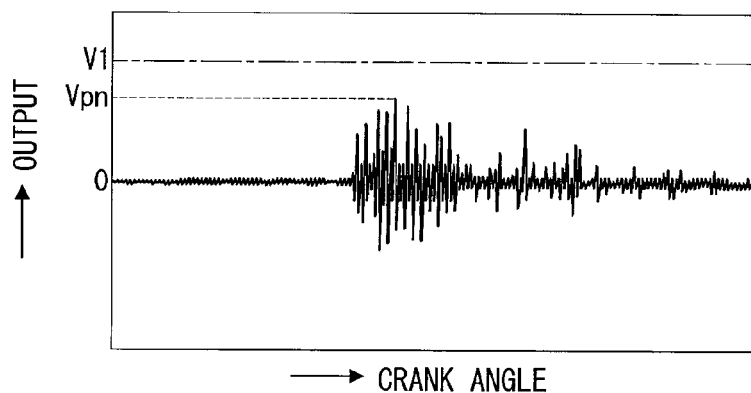
FIG. 6 is a chart showing a relationship between a crank angle and an output value of a knock sensor at a time when a normal fuel combustion occurs in an engine.
Figure 7:
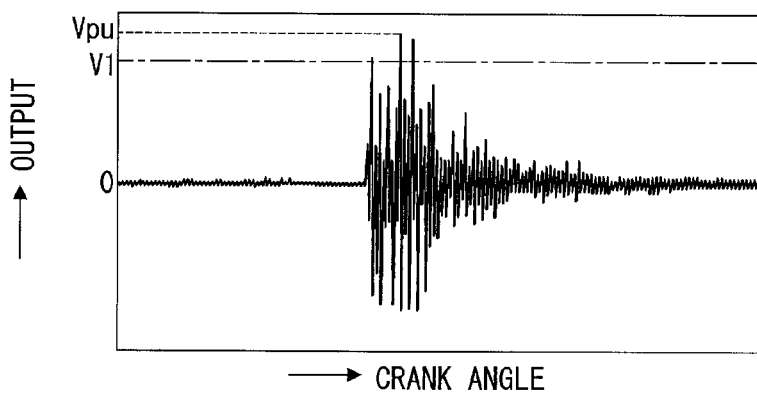
FIG. 7 is a chart showing a relationship between a crank angle and an output value of a knock sensor at a time when a large knocking is generated, which may cause a preignition.

FIG. 6 shows the output value of the knock sensor 36 when the normal ignition combustion is conducted. FIG. 7 shows the output value of the knock sensor 36 when a large knocking is generated, which may cause a preignition. As shown in FIG. 6, when a normal ignition combustion is conducted, a peak value Vpn of the output value of the knock sensor 36 becomes smaller than a threshold V1. Meanwhile, as shown in FIG. 7, when a relatively larger knocking is generated, a peak value Vpu of the output value of the knock sensor 36 becomes greater than the threshold V1. The threshold V1 is set up in advance based on experimental data, design data and the like.

When it is estimated that a preignition will be generated, the valve-opening-time controller 43 operates the exhaust-valve timing control mechanism 26 so as to advance the opening time of an exhaust valve 25 to suppress the preignition. As the opening time of the exhaust valve 25 is more advanced, a scavenging in the cylinder is more promoted. Thus, a preignition due to suspended matters (carbon deposits) can be restricted.

An opening time of the exhaust valve 25 at a time of when the engine 10 is started is defined as a base opening time θeob. According to the present embodiment, when the opening time of the exhaust valve 25 is retarded more that the base opening time θeob, the valve-opening-time controller 43 controls the exhaust-valve timing control mechanism 26 in such a manner the opening time agrees with the base opening time θeob. Meanwhile, when the opening time of the exhaust valve 25 agrees with the base opening time θeob as shown in FIG. 2, or when the opening time of the exhaust valve 25 is advanced more than the base opening time θeob as shown in FIG. 4, the valve-opening-time controller 43 controls the exhaust-valve timing control mechanism 26 in such a manner the opening time is advanced by a specified amount that is previously set according to experimental data or design data.

The valve timing control of the exhaust valve 25 for advancing its opening time will be referred to as "advance control of exhaust-valve-opening time".

[Processing of ECU 30]

Figure 8:
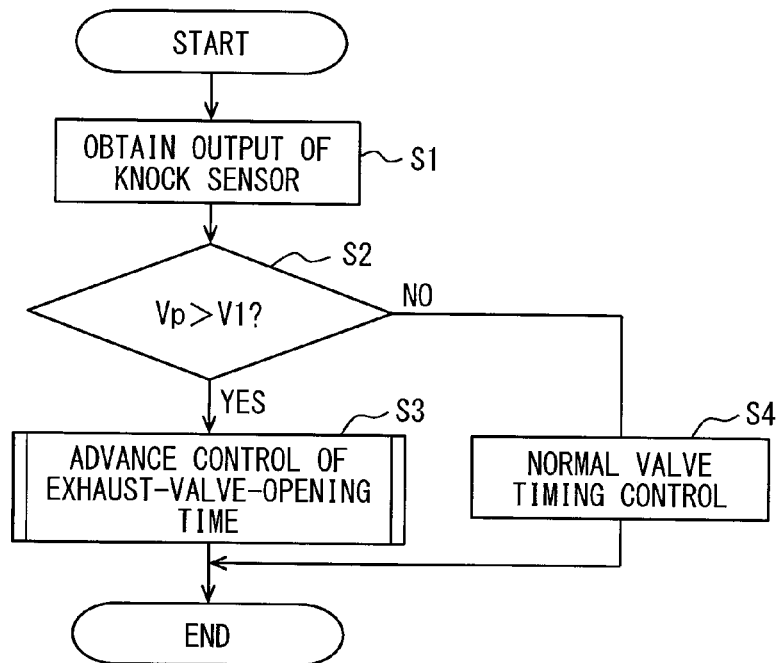
FIG. 8 is a flowchart showing a main routine which the electronic control unit performs.
Figure 9:
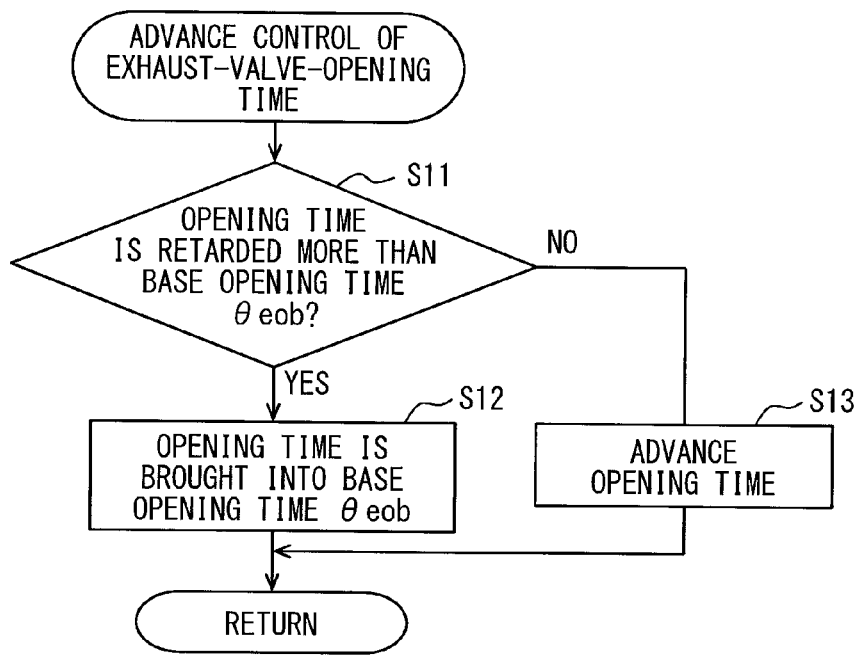
FIG. 9 is a flowchart showing a sub-routine which the electronic control unit performs.

Referring to FIGS. 8 and 9, a processing which the ECU 30 executes for suppressing a preignition will be described. The routines shown in FIGS. 8 and 9 are repeatedly executed after the ECU 30 is turned on until the ECU 30 is turned off. FIG. 8 shows a main routine and FIG. 9 shows a subroutine.

In S1, the output value of the knock sensor 36 is obtained.

In S2, it is determined whether the peak value Vp of the output value of the knock sensor 36 is more than the threshold V1. When the answer is Yes in S2, the procedure proceeds to S3. When the answer is No in S2, the procedure proceeds to S4.

In S3, the advance control of exhaust-valve-opening time shown in FIG. 9 is performed.

In S11, it is determined whether the opening time of the exhaust valve 25 is retarded more than the base opening time θeob. When the answer is Yes in S11, the procedure proceeds to S12. When the answer is No in S11, the procedure proceeds to S13.

In S12, the valve-opening-time controller 43 controls the exhaust-valve timing control mechanism 26 in such a manner that the opening time of the exhaust valve 25 agrees with the base opening time θeob. After S12, the procedure goes back to the main routine shown in FIG. 8.

In S13, the valve-opening-time controller 43 controls the exhaust-valve timing control mechanism 26 in such a manner that the opening time of the exhaust valve 25 is advanced by a specified amount. After S13, the procedure goes back to the main routine shown in FIG. 8. In S4, the normal valve timing control is performed.

[Advantages]

As described above, according to the first embodiment, the ECU 30 has an output-value obtaining portion 41, a preignition estimating portion 42 and a valve-opening-time controller 43.

The output-value obtaining portion 41 obtains the output value of the knock sensor 36, which corresponds to an intensity of an engine knocking. The preignition estimating portion 42 estimates that a preignition will be generated in an internal combustion engine 10, when the obtained output value is greater than or equal to the specified threshold V1. When the preignition estimating portion 43 estimates that a preignition will be generated, the exhaust-valve timing control mechanism 26 advances the opening time of the exhaust valve 25 to suppress the preignition.

According to the above configuration, it can be estimated that a preignition will be generated due to suspended matters in a cylinder, beforehand. Therefore, a suppressing control can be executed before the preignition is generated, so that the preignition can be avoided beforehand.

Moreover, the opening time of the exhaust valve 25 is advanced to scavenge suspended matters (carbon deposits) in a cylinder, whereby a preignition can be suppressed without fuel consumption increase.

Moreover, according to the first embodiment, when the opening time of the exhaust valve 25 is retarded more that the base opening time θeob, the valve-opening-time controller 43 controls the exhaust-valve timing control mechanism 26 in such a manner the opening time agrees with the base opening time θeob. Meanwhile, when the opening time of the exhaust valve 25 agrees with the base opening time θeob, or when the opening time of the exhaust valve 25 is advanced more than the base opening time θeob as shown in FIG. 4, the valve-opening-time controller 43 controls the exhaust-valve timing control mechanism 26 in such a manner the opening time is advanced by the specified amount.

Thus, when the engine is at high load, the opening time of the exhaust valve 25 is brought into the base opening time θeob, whereby the preignition can be avoided with high probability.

<Second Embodiment>

Figure 10:
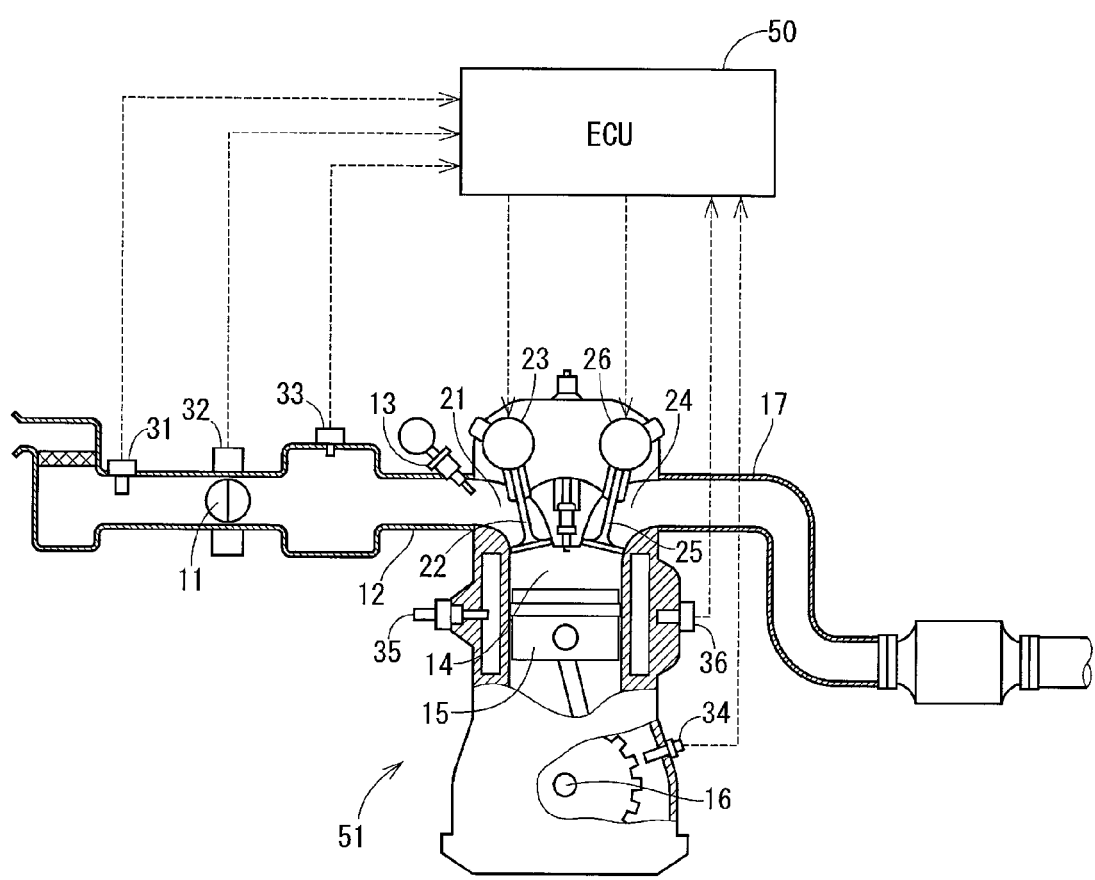
FIG. 10 is a chart showing an engine control system according to a second embodiment.

An electronic control unit as a preignition restraining device will be explained according to a second embodiment. As shown in FIG. 10, the electronic control unit (ECU) 50 is applied to a natural intake engine 51.

[Configuration of Engine 51]

Figure 11:
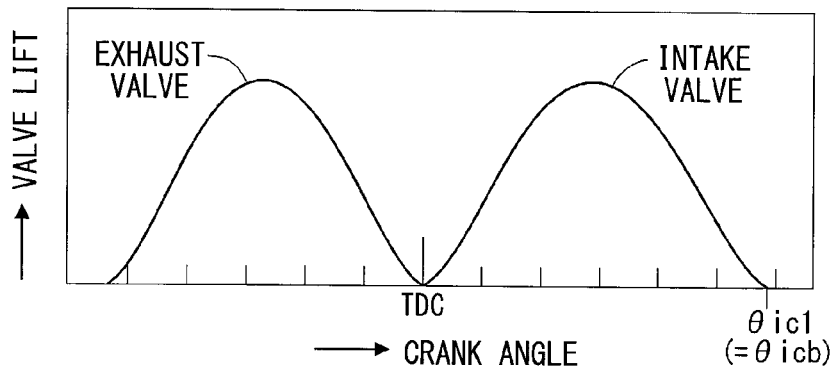
FIG. 11 is a chart showing a relationship between a crank angle and a valve lift amount of an exhaust valve and an intake valve at a time when an engine is started, according to the second embodiment.

At a time of starting the engine 51, the valve timing of the intake valve 22 and the exhaust valve 25 is set up as shown in FIG. 11.

Figure 12:
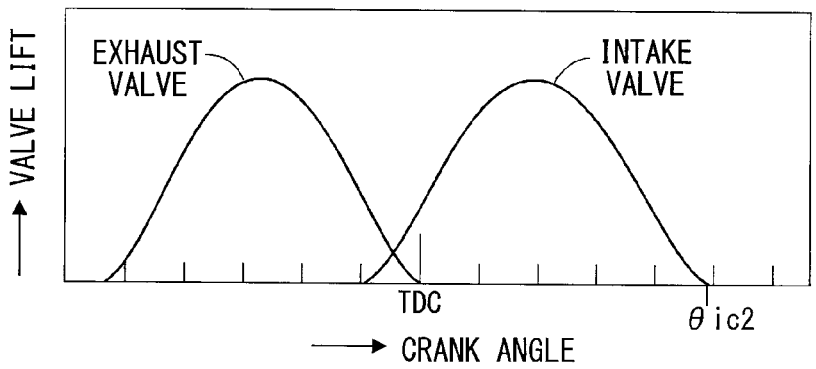
FIG. 12 is a chart showing a relationship between a crank angle and a valve lift amount of an exhaust valve and an intake valve at a time of improving an engine torque, according to the second embodiment.

In a case of a natural intake engine 51, when an increase in torque is needed, a valve timing of the intake valve 22 is advanced as shown in FIG. 12. At this time, the valve timing of the exhaust valve 25 is the same as that at the time of starting the engine 10. Alternatively, the valve timing of the exhaust valve 25 is advanced according to the valve timing of the intake valve 22. FIG. 12 shows a case where the valve timing of the exhaust valve 25 is the same as that at the time of starting the engine 10.

Figure 13:
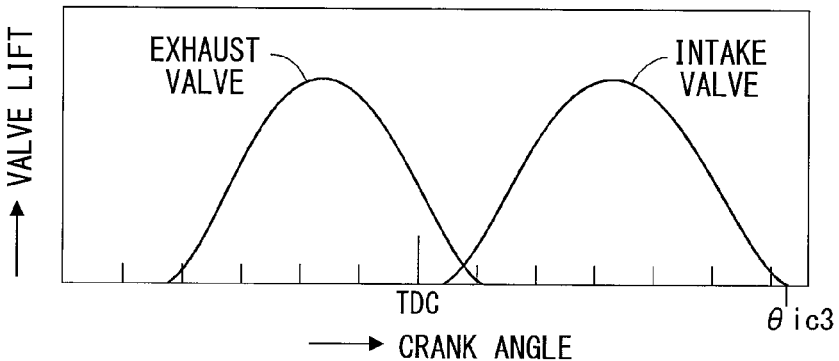
FIG. 13 is a chart showing a relationship between a crank angle and a valve lift amount of an exhaust valve and an intake valve at a time of improving a fuel economy, according to the second embodiment.

Meanwhile, when it is necessary to improve a fuel economy, the valve timing of the intake valve 22 is retarded as shown in FIG. 13. At this time, the valve timing of the exhaust valve 25 is the same as that at the time of starting the engine 10. Alternatively, the valve timing of the exhaust valve 25 is retarded according to the valve timing of the intake valve 22. FIG. 13 shows a case where the valve timing of the exhaust valve 25 is retarded.

An intake-valve timing control mechanism 23 adjusts the valve timing of the intake valve 22 so that a closing time of the intake valve 22 can be changed between $\theta ic1$ and $\theta ic3$, as shown in FIG. 11 to FIG. 13.

[Configuration of ECU 50]

Figure 14:
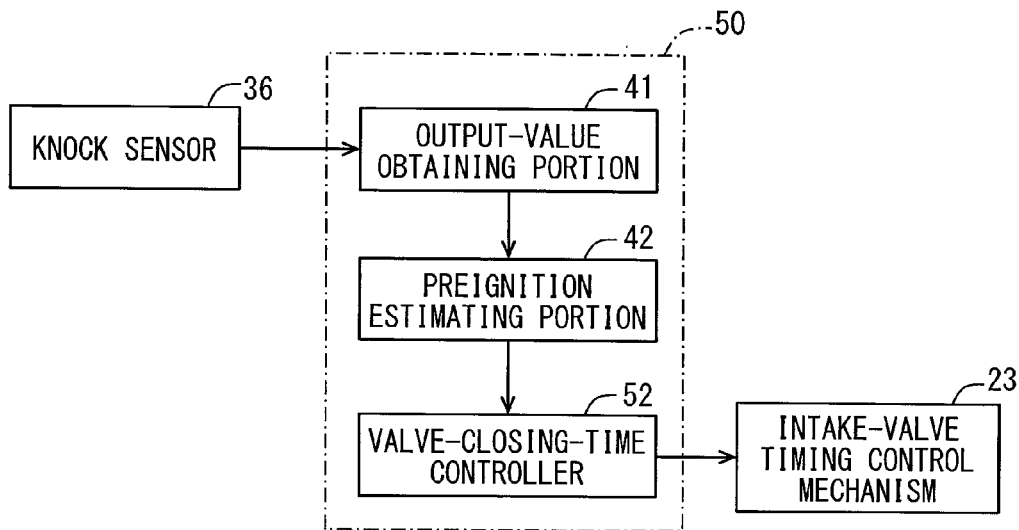
FIG. 14 is a block chart showing an electronic control unit according to the second embodiment.

Referring to FIGS. 11 to 14, a configuration of the ECU 50 will be explained. As shown in FIG. 14, the ECU 50 has functions for estimating whether a preignition will be generated due to suspended matters in the cylinder and for suppressing the preignition. Specifically, the ECU 50 has an output-value obtaining portion 41, a preignition estimating portion 42 and a valve-closing-time controller 52.

When it is estimated that a preignition will be generated, the valve-closing-time controller 52 operates the intake-valve timing control mechanism 23 so as to retard the closing time of the intake valve 22 to suppress the preignition. As the closing time of the intake valve 22 is more retarded, the pressure and the temperature in the cylinder are decreased. Thus, the preignition due to suspended matters (carbon deposits) can be restricted.

As shown in FIG. 11, a closing time of the intake valve 22 at a time of when the engine 10 is started is defined as a base closing time $\theta icb$. According to the present embodiment, when the closing time of the intake valve 22 is advanced more than the base closing time $\theta icb$, the valve-opening-time controller 52 controls the intake-valve timing control mechanism 23 in such a manner that the closing time agrees with the base closing time $\theta icb$. Meanwhile, when the closing time of the intake valve 22 agrees with the base closing time $\theta icb$ as shown in FIG. 11, or when the closing time of the intake valve 22 is retarded more than the base closing time $\theta icb$ as shown in FIG. 13, the valve-closing-time controller 52 controls the intake-valve timing control mechanism 23 in such a manner the closing time is retarded by a specified amount that is previously set according to experimental data or design data.

The valve timing control of the intake valve 22 for retarding its closing time will be referred to as "retard control of intake-valve-closing time".

[Processing of ECU 50]

Figure 15:
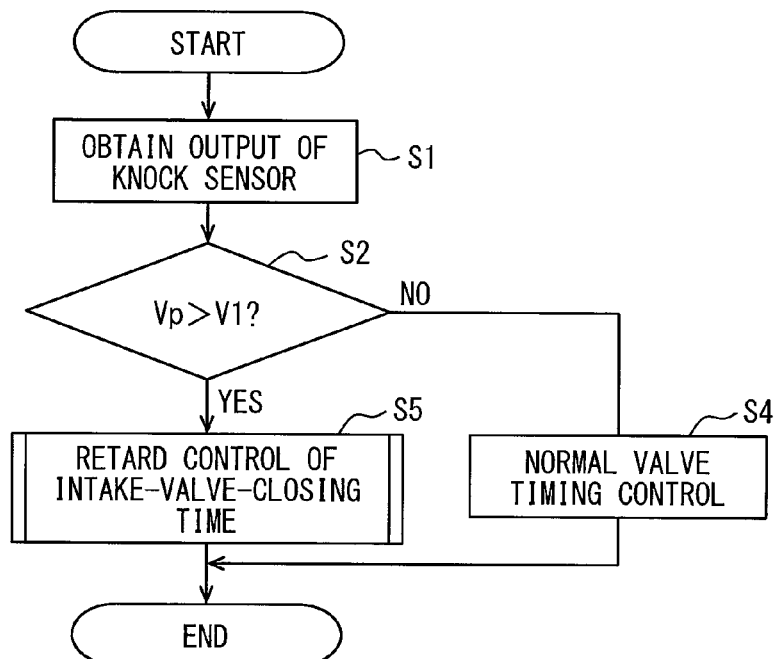
FIG. 15 is a flowchart showing a main routine which the electronic control unit performs, according to the second embodiment.
Figure 16:
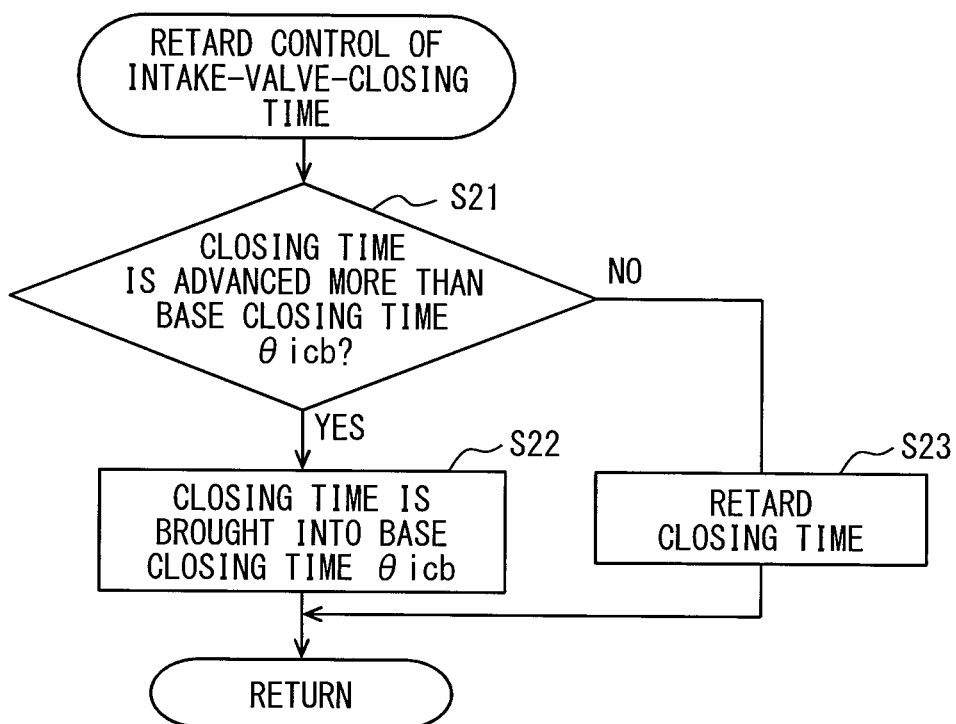
FIG. 16 is a flowchart showing a sub-routine which the electronic control unit performs, according to the second embodiment.

Referring to FIGS. 15 and 16, a processing which the ECU 50 executes for suppressing a preignition will be described. The routines shown in FIGS. 15 and 16 are repeatedly executed after the ECU 50 is turned on until the ECU 50 is turned off. FIG. 15 shows a main routine and FIG. 16 shows a subroutine. In S5, the retard control of intake-valve-closing time shown in FIG. 16 is performed.

In S21, it is determined whether the closing time of the intake valve 22 is advanced more than the base closing time $\theta icb$. When the answer is Yes in S21, the procedure proceeds to S22. When the answer is No in S21, the procedure proceeds to S23.

In S22, the valve-closing-time controller 52 controls the intake-valve timing control mechanism 23 in such a manner that the closing time of the intake valve 22 agrees with the base closing time $\theta icb$. After S22, the procedure goes back to the main routine shown in FIG. 15.

In S23, the valve-closing-time controller 52 controls the intake-valve timing control mechanism 23 in such a manner that the closing time of the intake valve 22 is retarded by a specified amount. After S23, the procedure goes back to the main routine shown in FIG. 15.

[Advantages]

As explained above, according to the second embodiment, the preignition restraining device can improve a possibility of preventing a generation of preignition and suppress the generation of preignition without increasing a fuel consumption.

According to the second embodiment, when the closing time of the intake valve 22 is advanced more than the base closing time $\theta icb$, the valve-opening-time controller 52 controls the intake-valve timing control mechanism 23 in such a manner that the closing time agrees with the base closing time $\theta icb$. Meanwhile, when the closing time of the intake valve 22 agrees with the base closing time $\theta icb$, or when the closing time of the intake valve 22 is retarded more than the base closing time $\theta icb$, the valve-closing-time controller 52 controls the intake-valve timing control mechanism 23 in such a manner the closing time is retarded by the specified amount. Thus, when the engine is at high load, the closing time of the intake valve 22 is brought into the base closing time $\theta icb$, whereby the preignition can be avoided with high probability.

<Other Embodiment>

In addition to the knock sensor, or instead of the knock sensor, a cylinder internal pressure sensor detecting a pressure in a cylinder, an ion sensor detecting an ion current generated at fuel combustion, the time of combustion of an air-fuel mixture, a gas-constituents sensor detecting gas constituents in emission gas, or an emission gas temperature sensor detecting a temperature of emission gas can be used. A valve-lift control mechanism or a valve-angle mechanism can be employed instead of the valve-opening-time control mechanism. Moreover, the valve-opening-time control mechanism may be hydraulically driven.

The present disclosure is not limited to the embodiment mentioned above, and can be applied to various embodiments.

What is claimed is:

1. A preignition restraining device for an internal combustion engine which is provided with a supercharger, a valve-opening-time control mechanism controlling a valve opening time of at least exhaust valve, and a knock detecting device detecting an intensity of an engine knocking, the preignition restraining device comprising:
   an output-value obtaining portion which obtains an output value of the knock detecting device;
   a preignition estimating portion which estimates that a preignition will occur when the output value is greater than or equal to a specified threshold; and
   a valve-opening-time controller which advances the valve opening time of the exhaust valve to suppress the preignition when the preignition estimating portion estimates that the preignition will occur.

2. The preignition restraining device according to claim 1, wherein
   the valve opening time of the exhaust valve at a time of starting the internal combustion engine is defined as a base opening time of the exhaust valve;
   the valve-opening-time controller controls the valve-opening-time control mechanism so that the valve opening time of the exhaust valve agrees with the base opening time, when the valve opening time of the exhaust valve is retarded more than the base opening time; and
   the valve-opening-time controller controls the valve-opening-time control mechanism so that the valve opening time of the exhaust valve is advanced by a specified amount, when the valve opening time of the exhaust valve agrees with the base opening time or when the valve opening time of the exhaust valve is advanced more than the base opening time.

3. A preignition restraining device for a natural intake internal combustion engine which is provided with a valve-closing-time control mechanism controlling a valve closing time of at least intake valve, and a knock detecting device detecting an intensity of an engine knocking, the preignition restraining device comprising:
- an output-value obtaining portion which obtains an output value of the knock detecting device;
- a preignition estimating portion which estimates that a preignition will occur when the output value is greater than or equal to a specified threshold; and
- a valve-closing-time controller which retards the valve closing time of the intake valve to suppress the preignition when the preignition estimating portion estimates that the preignition will occur.

4. The preignition restraining device according to claim 3, wherein
- the valve closing time of the intake valve at a time of starting the internal combustion engine is defined as a base closing time of the intake valve;
- the valve-closing-time controller controls the valve-closing-time control mechanism so that the valve closing time of the intake valve agrees with the base closing time, when the valve closing time of the intake valve is advanced more than the base closing time; and
- the valve-closing-time controller controls the valve-closing-time control mechanism so that the valve closing time of the intake valve is retarded by a specified amount, when the valve closing time of the intake valve agrees with the base closing time or when the valve closing time of the intake valve is retarded more than the base closing time.

5. A preignition restraining device for an internal combustion engine which is provided with a supercharger, an exhaust valve having a valve opening time, and a knock sensor for detecting an intensity of an engine knocking, the preignition restraining device comprising:
- an electronic control unit, including a processor and memory, the electronic control unit being at least configured to:
  - obtain an output value of the knock sensor;
  - estimate that a preignition will occur when the output value is greater than or equal to a specified threshold; and
  - advance the valve opening time of the exhaust valve to suppress the preignition when the estimated preignition will occur.

6. The preignition restraining device according to claim 5, wherein
- the valve opening time of the exhaust valve at a time of starting the internal combustion engine is defined as a base opening time of the exhaust valve;
- the electronic control unit is configured to provide control so that the valve opening time of the exhaust valve agrees with the base opening time, when the valve opening time of the exhaust valve is retarded more than the base opening time; and
- the electronic control unit is configured to provide control so that the valve opening time of the exhaust valve is advanced by a specified amount, when the valve opening time of the exhaust valve agrees with the base opening time or when the valve opening time of the exhaust valve is advanced more than the base opening time.

7. A preignition restraining device for a natural intake internal combustion engine which is provided with an intake valve having a valve-closing-time, and a knock sensor for detecting an intensity of an engine knocking, the preignition restraining device comprising:
- an electronic control unit, including a processor and memory, the electronic control unit being at least configured to:
  - obtain an output value of the knock sensor;
  - estimate that a preignition will occur when the output value is greater than or equal to a specified threshold; and
  - retard the valve closing time of the intake valve to suppress the preignition when the estimated preignition will occur.

8. The preignition restraining device according to claim 7, wherein
- the valve closing time of the intake valve at a time of starting the internal combustion engine is defined as a base closing time of the intake valve;
- the electronic control unit is configured to provide control so that the valve closing time of the intake valve agrees with the base closing time, when the valve closing time of the intake valve is advanced more than the base closing time; and
- the electronic control unit is configured to provide control so that the valve closing time of the intake valve is retarded by a specified amount, when the valve closing time of the intake valve agrees with the base closing time or when the valve closing time of the intake valve is retarded more than the base closing time.

* * * * *